United States Patent

Whitemyer

[15] 3,676,604

[45] July 11, 1972

[54] MULTIPLE TRUNK SIGNAL ARRANGEMENT

[72] Inventor: James Glenn Whitemyer, Reynoldsburg, Ohio

[73] Assignee: Bell Telephone Laboratories, Incorporated, Murray Hill, Berkeley Heights, N.J.

[22] Filed: Aug. 12, 1970

[21] Appl. No.: 63,203

[52] U.S. Cl. ................179/18 AB, 179/18 AH, 179/175.2 C

[51] Int. Cl. ..........................................................H04m 3/32

[58] Field of Search .......179/18 AB, 18 AH, 27 CA, 175.2 C

[56] References Cited

UNITED STATES PATENTS 3,225,144 12/1965 Gebhardt et al...................179/27 CA

*Primary Examiner*—Kathleen H. Claffy
*Assistant Examiner*—Thomas W. Brown
*Attorney*—R. J. Guenther and James Warren Falk

[57] ABSTRACT

A group of trunk circuits exhibiting a particular signal condition is detected by a respective one of a plurality of detecting circuits associated with a corresponding plurality of trunk circuit groups. The identity of the detected trunk group is encoded, transmitted to a remote point for display purposes and a signal acknowledging correct receipt of the encoded identity is returned. The returned acknowledgment signal is employed to prime the detecting circuit to respond to the appearance of the opposite signal condition at the associated trunk group and, pending receipt of the acknowledgment signal, the detecting circuit is prevented from responding to any change in the signal condition of its associated trunk group.

16 Claims, 2 Drawing Figures

INVENTOR
J. G. WHITEMYER
BY Howard R Popper
ATTORNEY

MULTIPLE TRUNK SIGNAL ARRANGEMENT

FIELD OF THE INVENTION

This invention relates to apparatus for monitoring the condition of a plurality of circuits capable of exhibiting either of two signal conditions and more particularly to an arrangement for reliably transmitting the monitored state of any of a plurality of circuits to a remote location together with the identity of the circuit exhibiting the detected state.

BACKGROUND OF THE INVENTION

The need to ascertain the state of any of a plurality of circuits and to transmit the state information together with the identity of the circuit exhibiting the particular state frequently arises in telephone switching systems. In the well-known centrex system, for example, it may become necessary to furnish an attendant console position with information pertaining to the state of a large number of trunks serving the telephone customer by whom the attendant is employed. In the centrex system, the status of the trunks will usually be available only at the trunk circuits themselves which appear in the switching frames of the central office. Usually the central office switching frames will be located a considerable distance from the attendant's console equipment. Under these circumstances, it becomes extremely important to provide an economical system capable of displaying the state of groups of trunks belonging to a particular telephone customer to the attendant serving that customer and to do so without requiring cabling between the trunk circuits and the attendant position on a per-trunk or per-trunk group basis.

STATEMENT OF THE INVENTION

In accordance with my invention, I provide a transmitter in proximity to the trunk circuits whose states are to be monitored and a receiver in proximity to the attendant position where the trunk states are to be displayed. I equip the transmitter with a detector for each of a group of trunk circuits and provide the detectors with a lock-out access to a transmission path between the transmitter and receiver over which path the detector may forward the identity of any one of the trunk groups undergoing a change between the idle state where some trunk circuits are idle and the busy state where all trunk circuits are busy. I provide each detector with a respective magnetic latching relay to store a trunk group state and thereby condition the associated detector to respond to the appearance of the opposite trunk group state when it occurs; accordingly my invention allows a reduction in the number of leads between the transmitter located in proximity to the trunk circuits and the receiver at the remote attendant console position. I provide an arrangement that permits a detector to transmit the associated trunk group identity momentarily to the receiver and to maintain a display at the receiver activated until a change in the trunk group state is detected. Following the receipt of the status change information at the receiver, an acknowledgment signal is returned to the transmitter which is employed to operate the magnetic latching relay to store the detected trunk group state in the respective detector circuit and to prime that circuit to respond to the appearance of the opposite trunk group state.

It is an aspect of my invention that a detector, after responding to the appearance of a particular trunk group state, is temporarily isolated from responding to subsequent changes in the state of the monitored trunk group until an acknowledgment signal is returned by the receiver. When the acknowledgment signal is returned, the detector is primed to respond to the appearance of the opposite signal state of the monitored trunk group. Thereafter, the detector may once again access the same transmission path on a lockout basis and forward the identity of the trunk group and the new trunk group state to the receiver. In this manner my monitoring arrangement provides for a reduction in the number of signal transmission leads required between the transmitter and receiver and simultaneously assures a positive operation of the display apparatus regardless of the physical separation between the display and the monitored trunk groups.

DESCRIPTION OF THE DRAWINGS

The above and other objects and features of the present invention will become more apparent upon consideration of the following detailed description in conjunction with the drawing, in which.

Figure 1:
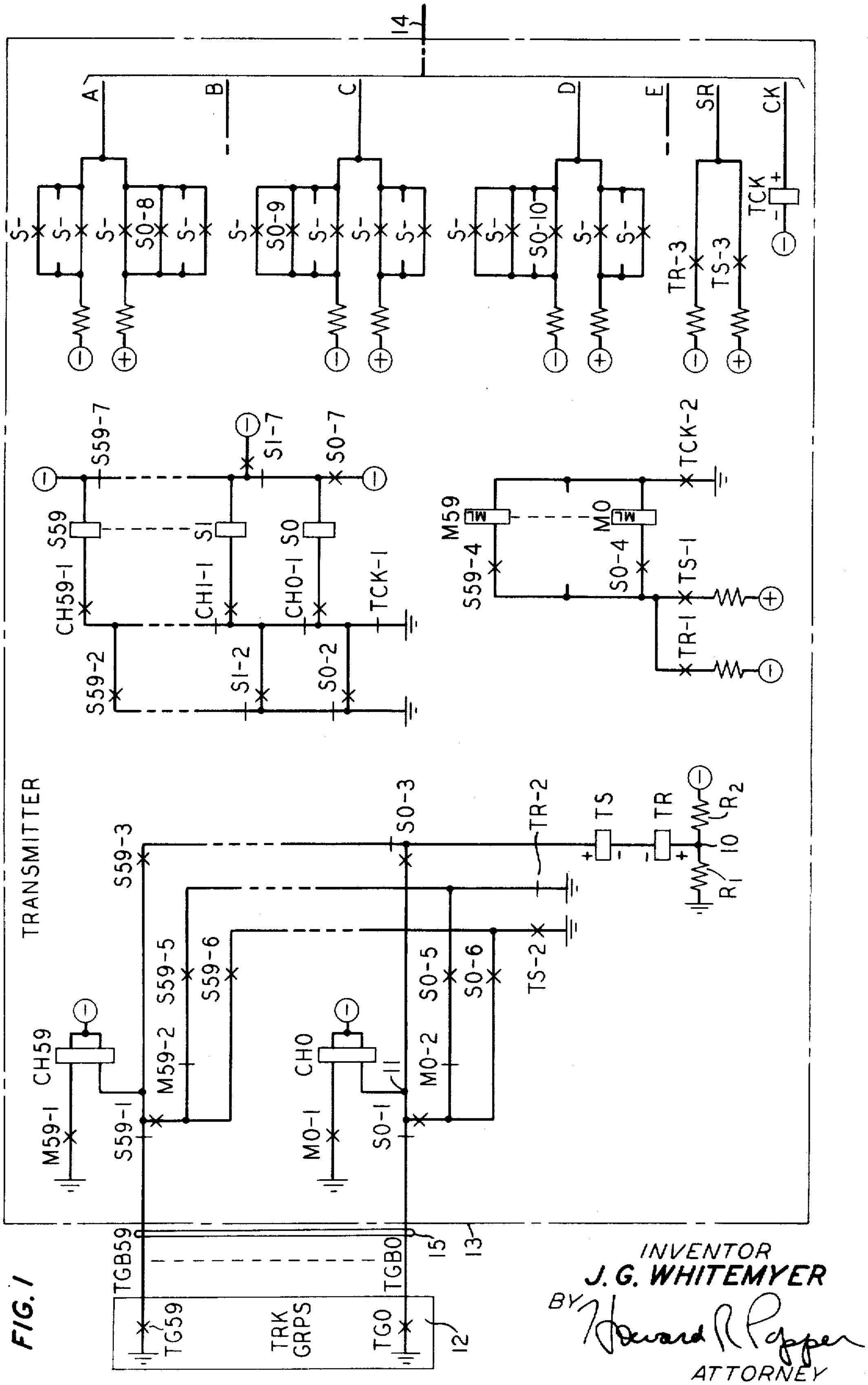
FIG. 1 is a schematic representation of the status change transmitter in accordance with one embodiment of the invention.
Figure 2:
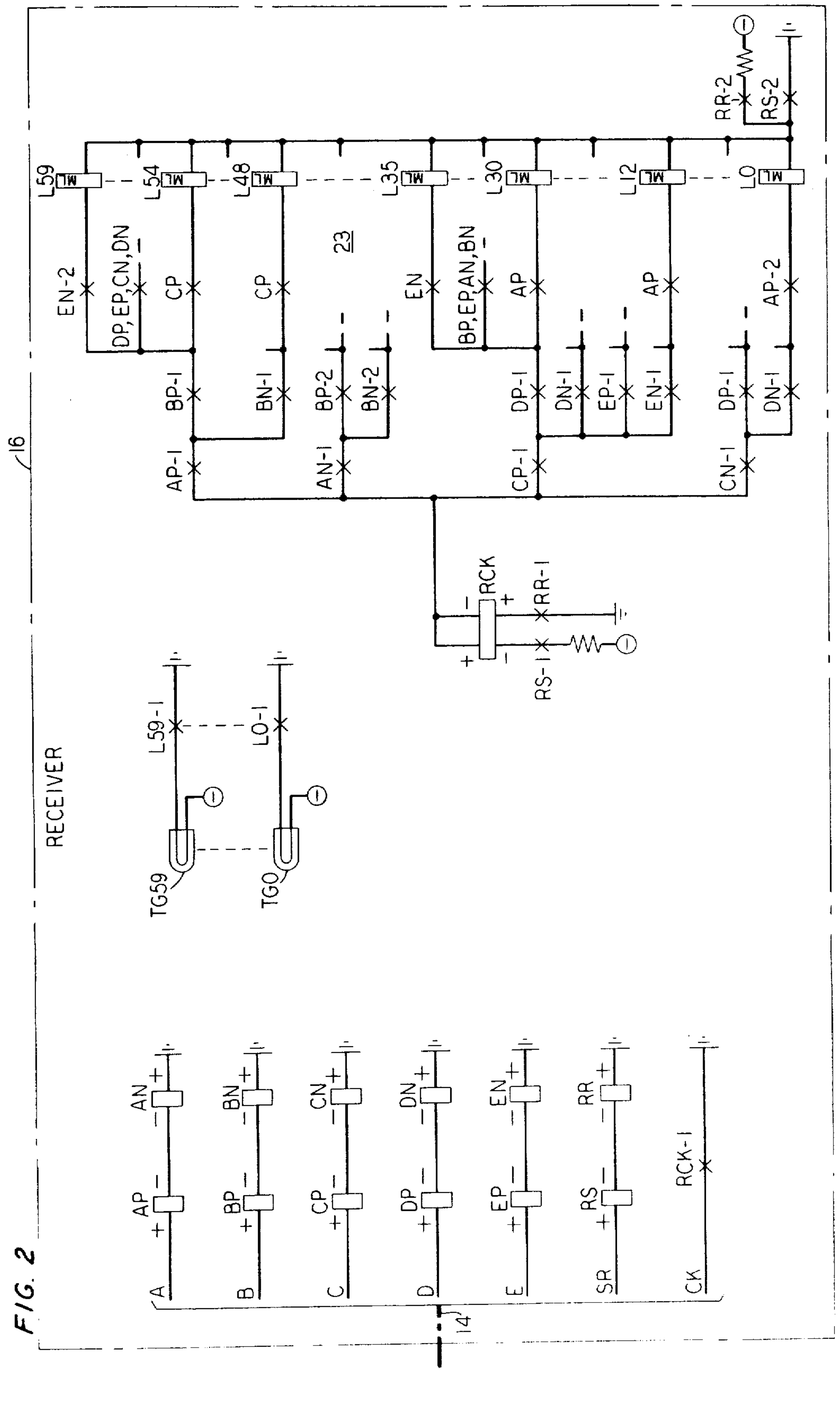
FIG. 2 is a schematic representation of the status change receiver in accordance with the illustrative embodiment of the present invention.

It will be noted that FIGS. 1 and 2 employ a type of notation referred to as "detached contact" in which an "X" represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the *American Institute of Electrical Engineers Transactions, Communications and Electronics* Vol. 74, pages 505–513.

GENERAL SYSTEM DESCRIPTION

In FIG. 1, trunk groups 12 comprise a plurality of work contacts TGO through TG59 each of which may be thought of as belonging to a respective trunk group. When one of the trunk groups is busy, it operates its respective one of contacts TG0 through TG59 to apply a ground on a respective one of leads TGB0 through TGB59 in cable 15. Similarly, when the trunk becomes idle it removes the ground from its lead in cable 15. Transmitter 13 is provided in accordance with my invention to detect when one of the trunk groups becomes busy, to detect when a previously busy trunk group becomes idle, and to transmit the busy or idle information together with the identity of the responsible trunk group over cable 14 to receiver 16 in FIG. 2. In addition, transmitter 13 is equipped to register an acknowledgment signal returned by receiver 16 over cable 14 and to prime itself to respond to the appearance of the opposite state from the trunk group whose state receiver 16 acknowledges has been correctly received. Pending receipt of the acknowledgment signal, transmitter 13 is adapted to ignore intervening state changes from the trunk group whose change it has reported to receiver 16.

DETAILED DESCRIPTION

Idle to Busy State Change

In trunk groups 12, if the trunk group associated with work contact TG0 had priorly been in an idle state, latching relay MO in transmitter 13 will be in the unlatched state. When this trunk group changes to the busy state, ground potential is applied through contact TG0 over lead TGB0 of cable 15 to transmitter 13. This ground potential is applied through break contact SO–1 to energize the lower winding of relay CH0. Relay CH0 operates, detecting the change in state of trunk group O, and in turn operates associated relay SO over a path through break contact TCK–1, make contact CH0–1, the winding of relay SO and a chain of break contacts S1–7 through S59–7. The break contact of transfer contacts CH0–1 prevents operating ground through contact TCK–1 from being applied to the windings of relays S1 through S59. In this chain, contacts of relays intermediate to relays S1 and S59 have been represented by the dotted lines. Relay SO operated locks to battery over its make contact SO–7 and to ground over the make contact of S0–2. The break contact of SO–2 opens the locking ground path for any relays S1 through S59.

The operation of relay S0 opens the operating path provided over lead TGB0 for relay CH0 at the break contact of SO–1. However, relay CHO is held operated by its lower winding over a path through break contact TR–2, make contacts S0–5, break contact MO–2, and the make contact of S0–1.

The new state of trunk group O of trunk groups 12 is determined by polar relays TS and TR in transmitter 13. After relays CH0 and S0 are operated, there is ground potential at point 11 as described above. This ground potential is connected through the make contact of S0–3 to the series connection of polar relays TS and TR. Point 10 is at a negative potential due to the voltage division of the negative supply voltage by resistors R1 and R2. The negative potential at point 10 causes a current to flow through polar relays TS and TR of a polarity that operates polar relay TS, indicating that trunk group O has changed to a busy state.

The contacts of relay S0 are assigned to encode the identity of trunk group O of trunk groups 12 by applying a positive potential to lead A of cable 14 through make contact S0–8, and negative potentials to leads C and D of cable 14 through make contacts SO–9 and S0–10 respectively. In like manner other S- relays apply distinctive codes identifying their associated trunk groups over leads A through E of cable 14. The use of 3/5 and bipolar potential signaling allows the use of fewer leads in cable 14 between transmitter 13 in FIG. 1 and receiver 16 in FIG. 2.

To indicate the new busy state of trunk group O to receiver 16 in FIG. 2, make contact TS–3 of operated relay TS transmits a positive potential over lead SR of cable 14 to receiver 16.

When receiver 16 in FIG. 2 registers the busy state of trunk group O, receiver 16 returns a ground potential on lead CK of cable 14 to transmitter 13, which operates relay TCK. The operation of relay TCK completes a ground operating path through its make contact TCK–2 for magnetic latching relays MO through M59 which are individually associated with the trunk groups 12. Relay MO is set to its latched state, indicating the busy state of trunk group O, over a path through make contacts TS–1 and S0–4, the coil of relay MO, and make contact TCK–2. It will be noted that relays TS, CHO, SO, and MO are operated at this time.

The operation of relay MO energizes the differentially wound upper winding of relay CHO through contact MO–1. As both windings of relays CHO are now energized, relay CHO is released, which in turn releases relay SO at make contact CHO–1. Relay TS in turn releases, for ground potential is interrupted at make contact SO–3. The negative and positive encoding potentials applied to leads A, C, and D of cable 14 are removed by the opening of contacts SO–8, SO–9, and SO–10. Receiver 16 in FIG. 2 in turn removes the ground potential on lead CK of cable 14, releasing relay TCK in transmitter 13 and restoring the S- relays operating path at break contact TCK–1. This leaves only magnetic latching relay MO operated, indicating the busy state of trunk group O.

The ground potential from trunk group O of trunk groups 12, applied over lead TGBO of cable 15 is again applied through the now released break contact SO–1 to the lower winding of relay CHO, holding it energized. The operation of relay MO and the release of relay SO removes the ground potential to point 11 that had been applied through break contact TR–2, make contact SO–5, break contact MO–2, and the make contact of SO–1. As relay MO is latched, both windings of relay CHO are energized, but being differentially wound relay CHO remains unoperated. Relay CHO is now in a condition to respond to the next change in state of trunk group O to the idle state.

Transmitter 13 is now prepared to transmit the next change of state of a trunk group in trunk groups 12 to receiver 16 in FIG. 2.

Busy to Idle State Change

When trunk group O of trunk groups 12 has been detected as being busy, both windings of differentially wound relay CHO are energized, as previously described. Accordingly, relay CHO remains unoperated. When trunk group O changes to the idle state, the ground potential applied from trunk group O through contact TGO, over lead TGBO of cable 15, through break contact SO–1 to the lower winding of relay CHO is removed, de-energizing the lower winding of relay CHO. Relay CHO operates as only the upper winding remains energized through make contact MO–1. Relay CHO operated, operates relay SO and the appropriate leads A through E of cable 14 are energized. However, point 11 is now at a negative potential because of the negative battery applied through the lower winding of relay CHO. Ground potential is interrupted at break contact MO–2. This negative potential at point 11 is applied through make contact SO–3 to the series combination of polar relays TS and TR. As previously discussed, point 10 is also at a negative potential. However, point 11 is at a more negative potential than that at point 10, causing current to flow such that relay TR operates instead of relay TS. The magnitude of the current operating relay TR is insufficient to fully energize the lower winding of relay CHO, so relay CHO remains operated.

Make contact TR–3 applies a negative potential to lead SR of cable 14 indicating to receiver 16 in FIG. 2 that trunk group O has changed to the idle state.

Relay TR operated prepares a path at its make contact TR–1 to apply negative potential for unlatching relay MO. After receiver 16 in FIG. 2 registers the status change of trunk group O to the idle state, a ground is returned to transmitter 13 over lead CK of cable 14, operating relay TCK and completing the current path to the winding of relay Mo which thereupon releases.

The unlatching of relay MO opens make contact MO–1, de-energizing the upper winding of relay CHO. Both windings of relay CHO being de-energized, relay CHO releases and is set to detect the next change in state of trunk group O of trunk groups 12. The release of relay CHO releases relays SO, TR, and in turn relay TCK, preparing the transmitter to transmit the next change of state of a trunk group in trunk groups 12 to receiver 16 in FIG. 2.

SIMULTANEOUS TRUNK GROUP STATUS CHANGES

When more than one CH- relay operates in transmitter 13, due to simultaneous changes in state of more than one trunk group in trunk groups 12, only one S- relay is allowed to operate due to the chain connection of break contacts CH( )–1. The lower numbered trunk group in trunk groups 12 will have its change in state transmitted to receiver 16 in FIG. 2 first before transmitter 13 can transmit the change in state of the next highest numbered trunk group to receiver 16.

STATUS CHANGE RECEIVER—FIG. 2

Idle to Busy State Change

When trunk group O of trunk groups 12 changes from an idle to a busy state, transmitter 13 in FIG. 1 places a positive potential on lead A of cable 14 and negative potentials on leads C and D of cable 14. This operates polar relays AP, CN, and DN respectively in receiver 16. In addition transmitter 13 applies a positive potential to lead SR of cable 14 when trunk group O changes to its busy state, causing polar relay RS in receiver 16 to operate. The operation of relays AP, CN, DN, and RS creates a path for the operation of latching relay LO to its latched state, indicating the busy state of trunk group O. There is an L-relay associated with each trunk in trunk groups 12. Contacts of the AN and AP through EN and EP relays form a matrix 23 for decoding the identity of the trunk group having changed state, and in addition they serve a checking function to check the transmitted code received over cable 14. The path applying the proper potential to latch relay LO is through make contact RS–1, one winding of relay RCK, make contacts CN–1, DN-1, and AP–2, the winding of relay LO and make contact RS-2. Relay RCK is also operated as it is in series with latching relay LO. Make contact RCK–1 returns ground potential over lead CK of cable 14 to transmitter 13 in FIG. 1, as previously discussed, and transmitter 13 is made free to transmit the next trunk groups 12 status change to receiver 16.

When relay LO operates, make contact LO-1 energizes lamp TGO at the centrex attendant positions, indicating all trunks in trunk group O of trunk groups 12 are busy.

Busy to Idle State Change

When trunk group O of trunk groups 12 changes from the busy to the idle state relays AP, CN, and DN are again energized, as previously described, identifying trunk group O. However, transmitter 13 in FIG. 1 applies a negative potential instead of a positive potential to lead SR of cable 14, which operates polar relay RR instead of polar relay RS. Make contact RR-1, a winding of relay RCK, make contacts CN-1, DN-1, and AP-2, the winding of latching relay LO, and make contact RR-2 provide a path to apply the proper potential for unlatching relay LO, indicating trunk group O is in its idle state. Relay RCK is again operated sending a ground on CK lead 14 to transmitter 13 in FIG. 1 causing transmitter 13 to be free to transmit the next status change of a trunk group in trunk groups 12 to receiver 16. The release of make contact LO-1 de-energizes lamp TGO at the attendant positions, indicating the idle state of trunk group O.

It is to be understood that the above-described arrangement is illustrative of the application of the principles of the invention. Numerous other arrangements may be devised by those skilled in the art without departing from the spirit and scope of the invention.

What is claimed is:

1. An arrangement for detecting and transmitting the state of any of a plurality of circuits capable of exhibiting either of two signal conditions to a remote point comprising:

a plurality of detector means, each of said detector means normally being connected to respond to the appearance of a predetermined one of said signal conditions at an associated one of said circuits, encoding means individual to said detector means and operative to transmit the identity of said circuits exhibiting said first signal condition to said remote point, and priming means responsive to the successful transmission of said identity to said remote point for rendering said last-mentioned one of said detector means operable to respond to an appearance of the other of said signal conditions at said associated circuit.

2. The arrangement in accordance with claim 1 wherein each of said detector means consists of a two winding differentially wound relay, a first winding of which is controlled by said priming means and the second winding of which is connected to said associated circuit.

3. The arrangement in accordance with claim 2 wherein said encoding means includes a first series of contacts of a first relay means controlled by said detector means.

4. An arrangement in accordance with claim 1 further including a receiver at said remote point, a transmission path to said receiver, and lockout means seizable by a responding one of said detector means for connecting said encoding means to said transmission path.

5. An arrangement in accordance with claim 4, wherein said receiver includes means for checking the validity of said identity transmitted over said transmission path by said encoding means and means controlled by said checking means for returning an acknowledgment signal over said transmission path to said detector means.

6. An arrangement in accordance with claim 5, wherein said priming means includes memory means controlled by said acknowledgment signal returned over said transmission path.

7. An arrangement in accordance with claim 6, wherein said memory means consists of a magnetic latching relay, said relay being in the latched state when said associated circuit exhibits said first one of said signal conditions and being in the unlatched state when said associated circuit exhibits the other of said signal conditions.

8. An arrangement in accordance with claim 6, further including a second relay means common to said plurality of detector means and operable under control of said encoding means for regulating the response of said memory means to said acknowledgment signal.

9. A monitoring arrangement comprising a detector circuit operable to respond to the appearance of a predetermined signal condition at a monitored circuit, a display device at a point remote from said detector circuit and operable to indicate the appearance of said predetermined signal condition, encoding means operated upon the operation of said detector circuit to transmit the identity of said monitored circuit to said remote point, receiver means at said remote point operative to operate said display device responsive to the receipt of said identity and for transmitting an acknowledgment signal to said detector circuit, and means at said detector circuit and controlled by said acknowledgment signal for conditioning said detector circuit to respond to the appearance of a second signal condition at said monitored circuit.

10. The monitoring arrangement in accordance with claim 9 further including holding means responsive to the operation of said encoding means for maintaining said detector circuit operated during a transmission of said identity to said remote point independent of any subsequent change in said predetermined signal condition.

11. The monitoring arrangement in accordance with claim 10 further including release means responsive to said acknowledgment signal for priming said detector circuit to respond to said second signal condition.

12. An arrangement for detecting and transmitting the state of any of a plurality of trunk groups to a remote point comprising:

a plurality of detecting means, each of said detecting means being operable to detect the appearance of a predetermined signal condition at an associated one of said trunk groups, encoding means individual to each of said detecting means and energized upon the operation of said detecting means to transmit the identity of the associated one of said trunk groups to a remote point, holding means associated with each of said detecting means and energized by any energized one of said encoding means for maintaining said detecting means operated during said transmission of said identity to said remote point independently of any subsequent change in said signal condition at said associated one of said trunk groups, storing means individual to each of said encoding means to be operated upon the appearance of said predetermine signal at an associated one of said trunk groups, means responsive to the successful transmission of said identity to said remote point for operating a respective one of said storing means, means controlled by the operation of said storing means for releasing said detecting means, and release means responsive to the releasing of said detecting means by said releasing means for releasing said holding means, the release of said holding means enabling said detecting means to respond to any subsequent change in the signal condition of said associated one of said trunk groups.

13. Means for detecting and signaling a change in signal condition of any of a plurality of trunk groups comprising:

detector means associated with each of said trunk groups, each said detector means connected to respond to a change in said signal condition at said associated trunk groups, display devices individual to each of said trunk groups at a point remote from said detector means for displaying the present signal condition of said trunk groups, encoding means individual to each of said detector means and operated to transmit the identity of a trunk group associated with a responding one of said detector means to said remote point, receiver means at said remote point responsive to the receipt of said transmitted identity to update and maintain said display devices operated, means responsive to the operation of said encoding means for disabling any responding one of said detector means from responding to any subsequent change in said signal condition, means associated with each of said detector means for storing the existing signal condition of said trunk circuits, selection means associated with each of said storing means and responsive to an operated one of said encoding means for preparing an operating path to an associated one of said storing means, acknowledgment means responsive to the receipt of said identity signals at said remote point to complete said prepared operating path and operate said storing means, first means associated with each of said detector means and responsive to the operation of the associated storing means for releasing the associated responding detector means, and second means responsive to the release of said detector means for releasing said disabling means to enable said detector means to respond to a subsequent change in said signal condition.

14. In a telephone system, a central office with a plurality of circuits capable of exhibiting a first or a second state, a transmitter, a receiver, and a transmission path linking said transmitter and said receiver, said transmitter including, a condition responsive device connected to each of said plurality of circuits, each of said devices being operable to respond to a change in the state of an associated one of said circuits, means for applying a signal to said transmission path, said applying means singly and sequentially responsive to operated ones of said devices for signaling the identification of said circuit singly associated with said applying means, registration means in said receiver for storing the existing ones of said states exhibited by said circuits, said registration means responsive to the receipt of said identification signal for registering the new state of said circuit singly associated with said applying means, display means in said receiver associated with each of said circuits, said display means responsive to said registration means for displaying the existing ones of said states exhibited by said circuits, verification means in said receiver, said verification means responsive to the receipt of said identification signal for returning an acknowledgment signal to said transmitter, and means at said transmitter responsive to the receipt of said acknowledgment signal for releasing said transmitter to detect subsequent changes in the state of said circuits.

15. An arrangement for detecting and transmitting to a remote point a trunk group state comprising a two-winding differentially wound relay having a voltage source connected to one side of both windings and having the other end of a first of said windings responsive to ground indicating the trunk group state, encoding means including an encoding relay responsive to operation of said differentially wound relay to transmit the identity of the trunk group to the remote point, holding path means for said differentially wound relay including contacts of said encoding relay for maintaining said differentially wound relay operated during said transmission of said identity to said remote point independent of the removal of the ground indicating a change of state of the trunk group, a magnetic latching relay responsive to the operation of said encoding relay and having contacts connecting the other end of the second winding of said differentially wound relay to ground upon the operation of said latching relay to release said differentially wound relay, and acknowledgment means responsive to the successful transmission of said identity to the remote point for operating said magnetic latching relay and releasing said encoding means.

16. An arrangement in accordance with claim 15 further comprising a pair of polar relays series connected in a path including make contacts of said encoding relay between a source of potential and said other end of said first winding of said differentially wound relay, one of said polar relays being operated when said ground appears at said other end of said first winding to indicate the presence of said trunk group state and the other of said polar relays being operated when said voltage source appears at said other end of said first winding to indicate the absence of said trunk group state.

* * * * *